United States Patent [19]

Hibino et al.

[11] Patent Number: 4,604,658
[45] Date of Patent: Aug. 5, 1986

[54] MEMORY CONTROL CIRCUIT FOR REMOVING JITTER

[75] Inventors: Chitoshi Hibino; Harukuni Kobari, both of Yokohama, Japan

[73] Assignee: Victor Company of Japan, Limited, Japan

[21] Appl. No.: 662,535

[22] Filed: Oct. 19, 1984

Related U.S. Application Data

[63] Continuation of Ser. No. 311,026, Oct. 13, 1981, abandoned.

[51] Int. Cl.⁴ .............................................. H04N 5/78
[52] U.S. Cl. .................................... 360/36.2; 360/27; 360/32; 358/339; 364/900
[58] Field of Search ................ 360/8, 36.1, 362, 38.1, 360/32, 37, 27, 39; 358/320, 339; 365/189, 230, 233

[56] References Cited

U.S. PATENT DOCUMENTS

| | | | |
|---|---|---|---|
| 3,344,406 | 9/1967 | Vinal | 364/200 |
| 3,643,031 | 2/1972 | Sasaki et al. | 370/104 |
| 3,648,247 | 3/1972 | Guzak, Jr. | |
| 3,729,717 | 4/1973 | de Koe et al. | 364/900 |
| 3,836,891 | 9/1974 | McDaniel | |
| 4,040,027 | 8/1977 | Vanes et al. | |
| 4,054,921 | 10/1977 | Tatami | |
| 4,056,851 | 11/1977 | Hovagimyan et al. | 364/900 |
| 4,141,039 | 2/1979 | Yamamoto | 360/32 X |
| 4,220,997 | 9/1980 | Hager | 364/900 |
| 4,226,476 | 1/1980 | Hashimoto | 360/32 |
| 4,392,162 | 7/1983 | Yamamoto | 360/38.1 X |

FOREIGN PATENT DOCUMENTS

| | | |
|---|---|---|
| 026602 | 4/1981 | European Pat. Off. |
| 52-102013 | 8/1977 | Japan |
| 1144327 | 3/1969 | United Kingdom |
| 1505603 | 3/1978 | United Kingdom |
| 1530633 | 11/1978 | United Kingdom |
| 2071372 | 3/1981 | United Kingdom |

*Primary Examiner*—Aristotelis M. Psitos
*Attorney, Agent, or Firm*—Lowe, Price, LeBlanc, Becker & Shur

[57] ABSTRACT

A random access memory has: upper and lower address limits, an address input responsive to an address counter, a write enable input, a read enable input, a data input bus, and data output bus. The address counter is supplied with a synchronization signal having a frequency determined by the frequency of a variable frequency data source. A signal having first, second and third values, respectively indicative of the address input of the memory being at the upper limit for the memory address, the lower limit for the memory address and between the upper and lower limits, is derived in response to the count in the address counter. First, second and third oscillators respectively derive first, second and third fixed frequencies such that the third frequency is greater than the second frequency and the second frequency is greater than the first frequency. The first, second and third fixed frequencies are coupled to the address counter while the signal has the third, second and first values.

6 Claims, 4 Drawing Figures

MEMORY CONTROL CIRCUIT FOR REMOVING JITTER

This application is a continuation of application Ser. No. 311,026, filed Oct. 13, 1981, now abandoned.

BACKGROUND OF THE INVENTION

The present invention relates generally to a circuit for controlling a memory in which a reproduced signal is stored for jitter elimination and time expansion purposes.

In conventional PCM systems, as shown and described in U.S. Pat. No. 4,206,476, a converted original signal is time-compressed and combined with error detection and correction codes and synchronization pulses prior to being recording on a recording medium. The reproduced original signal is separated from such control signals and coupled to a memory to expand its time dimension and eliminate jitter which has been introduced due to mechanical tolerances of the recording system. The memory is controlled by write and read address counters that store a jitter-affected digital signal in response to the jitter-affected sychronization pulse. The memory is read out by the counters in response to a standard constant rate pulse which occurs at a lower rate than the synchronization pulse so that the digital signal is time-expanded.

A shortcoming inherent in the conventional memory control circuit is that the memory may overflow when a large amount of jitter is generated; such overflow is due to transients such, as starting of the recorder in playback mode or a temporary fluctuation of tape. Noise is thus generated when the overflowing signal is converted into an analog signal.

In a prior art approach to solve this problem, disclosed in Japanese published application No. 52-102013, the read address counter is cleared when the memory is approaching an overflow condition to prevent overflow of the memory. A muting circuit masks the noise which would result from the rapid change in digital value when the reading address counter is cleared, thus producing an interruption of sound.

SUMMARY OF THE INVENTION

The present invention overcomes the noise generation problem by varying the incremental rate of the read address counter in a direction to decrease the incrementing rate from a standard rate when the memory is approaching an upper limit or in an opposite direction when the memory is approaching a lower limit. The variation of the incrementing rate in either direction continues until an intermediate address count is reached so that the same data word is repeatedly read out for delivery to an output circuit when the incrementing rate is decreased or an intermediate data word is skipped when the incremental rate is increased. There is no appreciable transition in digital value when the incrementing rate is varied which would amount to noise of noticeable degree.

According to the present invention, there is provided a circuit for controlling a memory adapted to store jitter-containing data words which are written into the memory at a rate corresponding to the occurrence rate of the data words. The circuit comprises a first address counter arranged to be incremented at the variable rate for generating a digital incrementing value that addresses storage locations into which the data words are written. A second address counter is normally incremented at a standard constant rate to generate a digital incrementing value that addresses storage locations from which the stored data words are to be read, means for reading data words are read at the constant rate from the storage locations addressed by the second counter. When the number of data words stored in the memory reaches an upper or a lower limit, the incrementing rate of the second counter is respectively increased or decreased.

In accordance with an aspect of the present invention a random access memory has: upper and lower address limits, an address input, a write enable input, a read enable input, a data input bus, and a data output bus. An address counter means is provided for the address input. A means responsive to the data source supplies the address counter means with a synchronization signal having a frequency determined by the frequency of a variable frequency data source and supplies a signal indicative of the count in the address counter means to the address input and simultaneously enables the write enable input of the memory. A means responsive to the address counter means derives a signal having first, second and third values respectively indicative of the address input of the memory being at the upper limit for the memory address, the lower limit for the memory address, and between the upper and lower limits. First, second and third oscillators respectively derive first, second and third fixed frequencies such that the third frequency is greater than the second frequency and the second frequency is greater than the first frequency. Means responsive to the signal deriving means and the first, second and third oscillators couples the first, second and third fixed frequencies to the address counter means while the signal has the third, second and first values and supplies a signal indicative of the count in the address counter means to the address input and simultaneously enables the read enable input of the memory at a time while the write enable input is not enabled.

BRIEF DESCRIPTION OF THE DRAWINGS

The invention will be described in further detail with reference to the accompanying drawings, in which.

DETAILED DESCRIPTION

Figure 1:
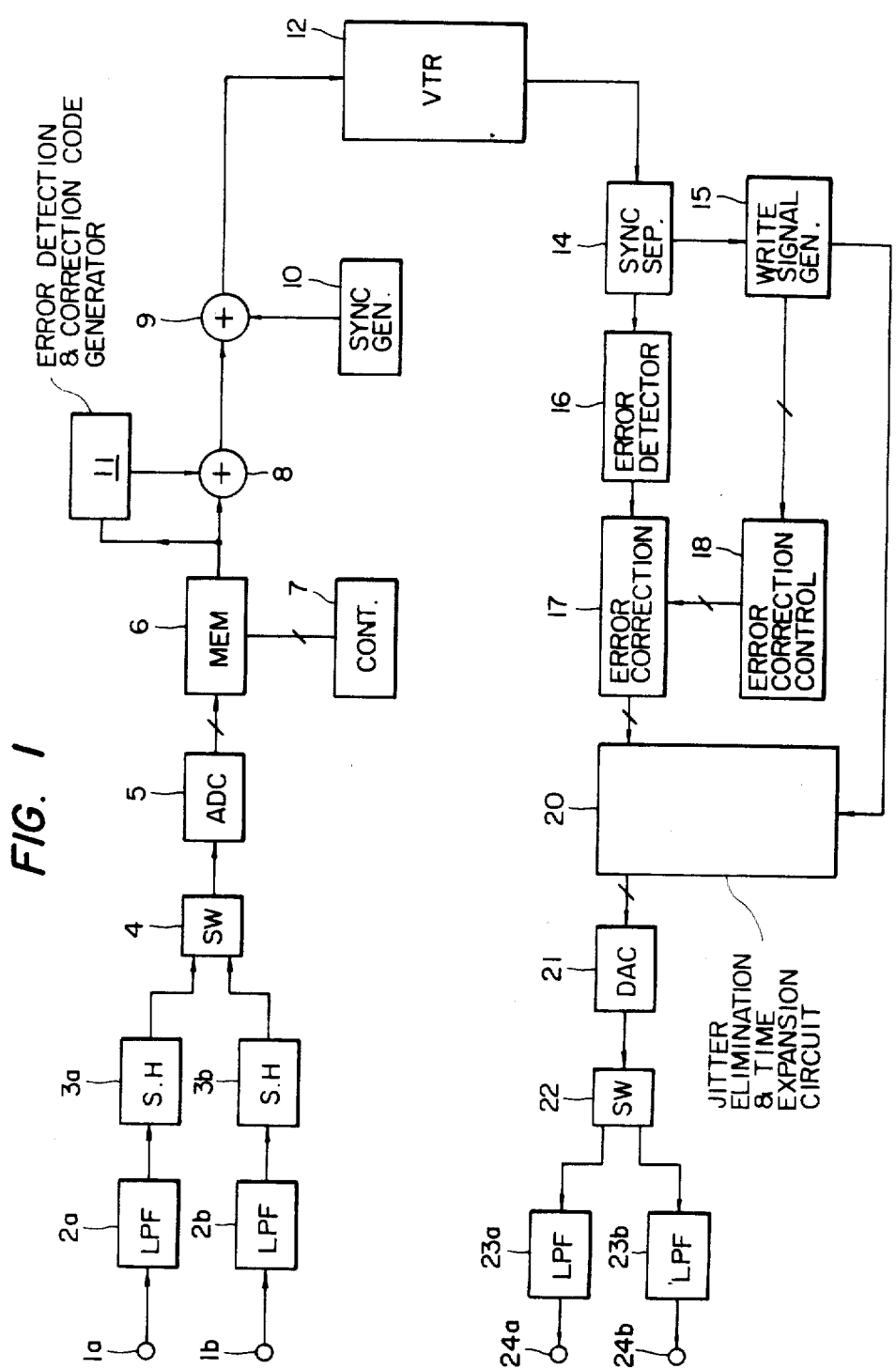
FIG. 1 is a schematic block diagram of a PCM recording and reproducing system embodying the invention.

Referring now to FIG. 1, there is shown a PCM recording-reproducing apparatus embodying the present invention in schematic form. Two channel analog audio signals are coupled to low-pass filters 2a, 2b through input terminals 1a, 1b to cut off the high frequency components of the input signals and thence to sample-hold circuits 3a, 3b in a well known manner. The sampled voltages are alternately coupled through a known multiplexer or switching circuit 4 to an analog to digital converter 5 where the sampled analog values are translated into corresponding digital codes represented by a predetermined number of binary digits. Thus, the sample-hold circuits 3a, 3b, multiplexer 4 and analog to digital converter 5 form a two-channel PCM encoder. To insert vertical and horizontal sync pulses and error detection and correction codes into the PCM information signal, the outputs of converter 5 is written into a time compression memory 6 and is read out of the memory at a rate higher than the input rate. A memory control unit 7 controls the input and output rates of the memory 6. The time-compressed digital signal is coupled to an adder 8 where it is combined with error detection and correction codes supplied from an error detection and correction code generator 11. The output of adder 8 is coupled to an adder 9 where it is combined with vertical and horizontal sync pulses supplied from a sync generator 10. The output of adder 9 is coupled to a conventional video tape recorder 12 of a helical scan type and recorded along skewed tracks in the same manner as video signals are recorded.

A reproduced digital signal derived from recorder 12 is applied to a sync separator 14 whence the sync pulses are separated and applied to a write signal generator 15. The remainder of the signal derived from recorder 12 is coupled to a conventional error detector 16 in which erroneous information bits are detected in a known manner and supplied to an error corrector 17 which is controlled by an error corrector control unit 18. The error detection and correction codes are removed from the stream of information bits and coupled to a jitter elimination and time expansion circuit 20 constructed in accordance with the invention. The circuit 20 includes a memory and a memory control circuit, described infra. Circuit 20 receives write control signals from the generator 15 in synchronism with the separated sync pulses. The information bits are written into the memory of circuit 20 on a per word basis and are read from the memory at a specified constant rate in order to eliminate jitters introduced by the video tape recorder due to its mechanical tolerances. Since the reproduced digital signal has a smaller time dimension than the original signals, the circuit 20 expands the time dimension of the reproduced digital signal in a manner detailed later.

The output of jitter elimination and time expansion circuit 20 is coupled to a digital to analog converter 21 to translate the time-expanded information bits forming each data word into a voltage signal which is alternately coupled through a demultiplexer or switch 22 to low-pass filters 23a and 23b to reconstruct the original audio signals for delivery through respective output terminals 24a and 24b to a stereo reproduction circuit, not shown.

Figure 2:
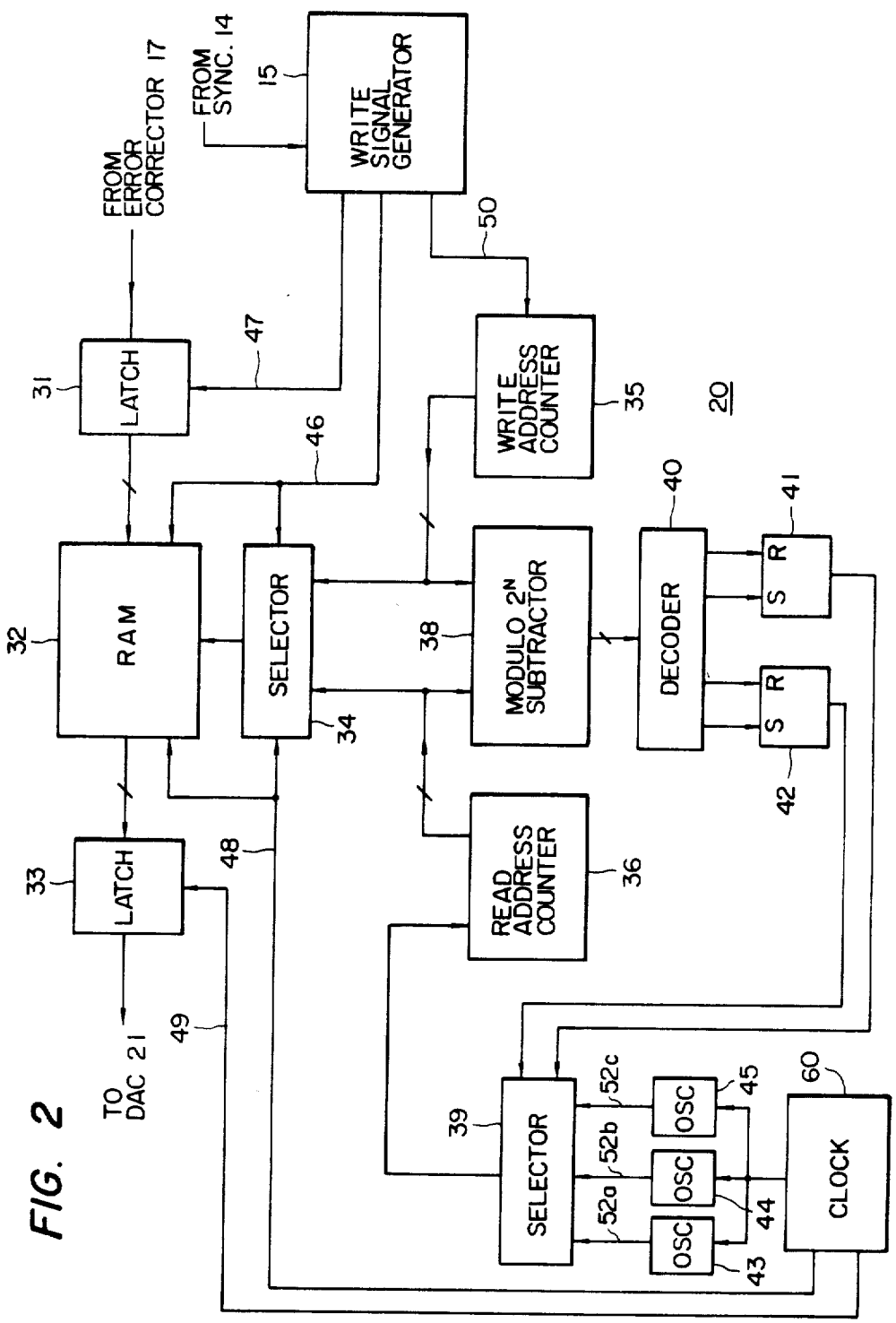
FIG. 2 is a block diagram of the jitter elimination and time expansion circuit of FIG. 1.
Figure 3:
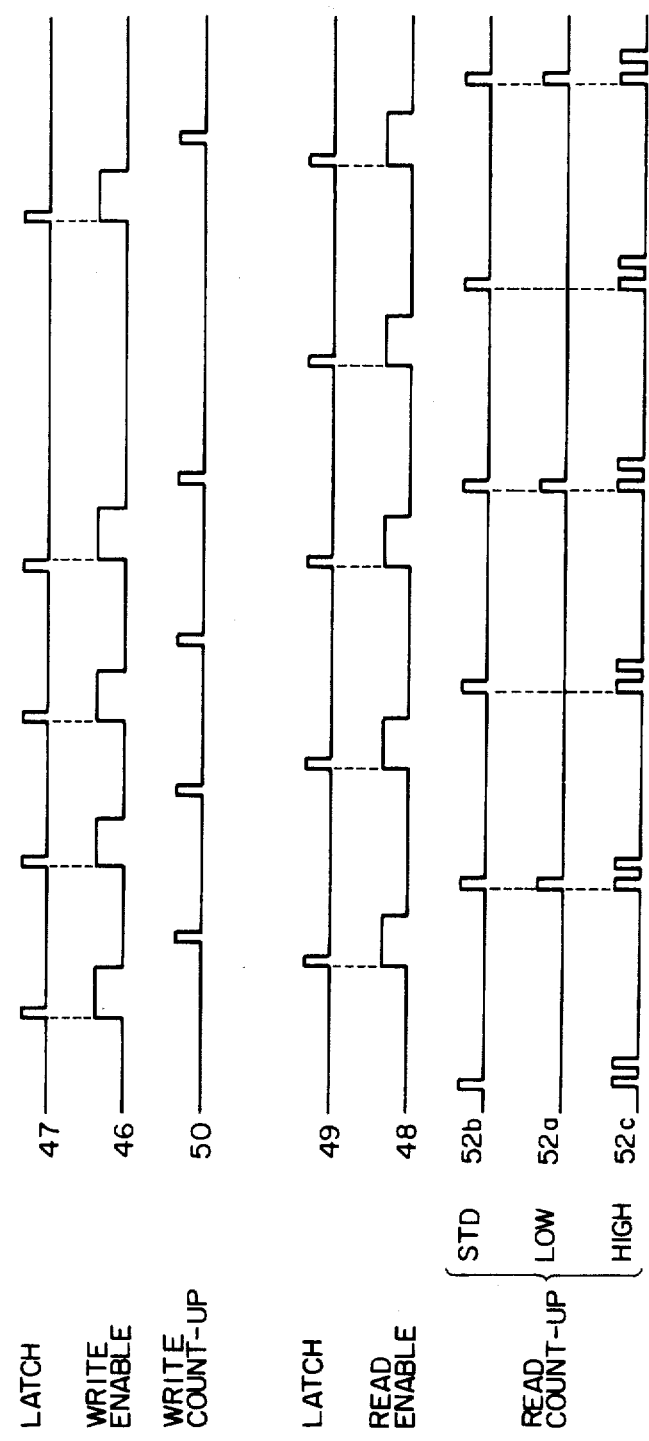
FIG. 3 is a waveform diagram associated with the circuit of FIG. 2.

Referring now to FIG. 2, details of the jitter elimination and time expansion circuit 20 are illustrated. The output of error corrector 17 is coupled to an input latch 31 and temporarily stored therein in response to a latch pulse 47 (see FIG. 3) supplied from write signal generator 15. The latter generates the latch pulse as well as write enable pulses 46 and count-up pulses 50 in sychronism with the separated sync pulses. Write enable pulses are applied to a random access memory 32 and to a selector 34, and count-up pulses are applied to a write address counter 35. In response to a write enable pulse 46, RAM 32 is enabled and selector 34 is switched so the input to the selector from write address counter 35 is coupled to RAM 32 RAM 32 stores the latched data on a per data word basis in a storage location specified by write address counter 35. The counter 35 is incremented by a subsequent count-up pulse 50 to specify the next storage location.

The output of write address counter 35 is also coupled to one input of modulo $2^N$ subtractor 38 having a second input responsive to an output from a read address counter 36 to detect the difference in address count between the two counters. The output of the subtractor 38 is coupled to a decoder 40 which translates the differential count value to constantly monitor the number of data words stored in RAM 32 for the purpose of detecting when RAM 32 is approaching an overflow or underflow condition so as to determine the rate at which the reading address counter 36 is to be incremented.

The stored data words are read out of RAM 32 into an output latch 33 on a per word basis from the locations specified by an address count supplied through selector 34 from read address counter 36 in response to a readout enable pulse 48 supplied from a frequency stabilized clock source 60. The data latched in output latch 33 are delivered to the digital to analog converter 21 in response to a readout latch pulse 49 also supplied from the clock source 60. These readout pulses 49 and 48 occur at intervals later than the write pulses 47 and 46 as is seen from FIG. 3 to expand the time dimension of the digital signal. Since the sync pulses and the information bits supplied to the latch 31 are jitter affected by the time axis fluctuation of the video transport mechanism of the recorder 12 and since the reading pulses 48, 49 are derived from the frequency stabilized source, the data read out of RAM 32 contain no jitter components.

Read address counter 36 is normally incremented at a standard rate in response to count-up pulses 52b supplied via a selector 39 from a standard frequency oscillator 44 having an input responsive to the output of clock source 60.

RAM 32 has a memory capacity needed to store a number of data words which is likely to be encountered when the data are affected by jitter since jitter tends to reduce the effective number of storable data words. Thus, the memory capacity of RAM 32 is determined so that the number of words stored therein can become zero only under severe jitter conditions that create an underflow condition. The memory capacity of RAM 32 is somewhat higher than the number of storable data words so that the data yet to be read out can be rewritten with a fresh data word creating an overflow condition.

Assume that the memory capacity of RAM 32 is $2^N$ data words (where N is an integer), whereby the $2^N$ storage locations are addressable by counts ranging from "0" to "$2^N-1$" and the count values of both counters 35 and 36 are incremented from "0" to "$2^N-1$" and then return to "0" again to repeat the process.

The count value of write address counter 35 always precedes the count value of read address counter 36. Since RAM 32 has a memory capacity of $2^N$ words, read address counter 35 is not incremented to a value higher than the count value of write address counter 36 by $2^N-1$.

Modulo $2^N$ subtractor 38 provides modulo $2^N$ subtraction of binary counts reached in writing and reading address counters 35 and 36 to detect the effective number of data words stored in RAM 32. Decoder 40 checks the differential count value against a lower limit value which may be "1", for example, and generates an early warning signal indicating that RAM 32 is approaching an underflow condition. Decoder 40 also checks the differential count value against an upper limit value which may be "$2^N-2$", for example, and generates an early warning signal indicating that RAM 32 is approaching an overflow condition.

The underflow warning signal derived by decoder 40 is coupled to the set input of an underflow flip-flop, or flag, 42 to provide a logical "1" output to selector 39 to cause it to couple count-up pulses 52a supplied from a oscillator 43 having a lower frequency than oscillator 44. The frequency of count-up pulses 52a is lower than the standard frequency and hence is lower than the rate at which the data are delivered from the output latch 33. Thus, the read address counter 36 is clocked at a reduced rate, increasing the effective number, or differential count value and the same data word is repeatedly read out of RAM 32 because of the difference in the reading rates of latch 33 and counter 36. The instantaneous value of the output of subtractor 38 is continuously monitored by decoder 40 checking it against an intermediate value, preferably equal to one-half of the memory capacity of RAM 32. Decoder 40 delivers a reset signal to the underflow flag 42 to return the reading rate to normal when the differential count value reaches one-half of the maximum storable data words.

Figure 4:
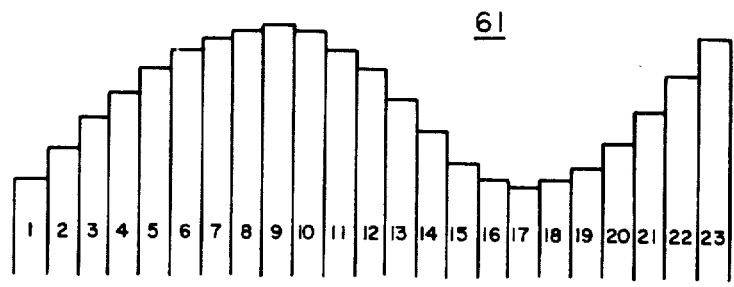
FIG. 4 is a waveform diagram of the digital signal read out of the memory of FIG. 2.
Figure 4:
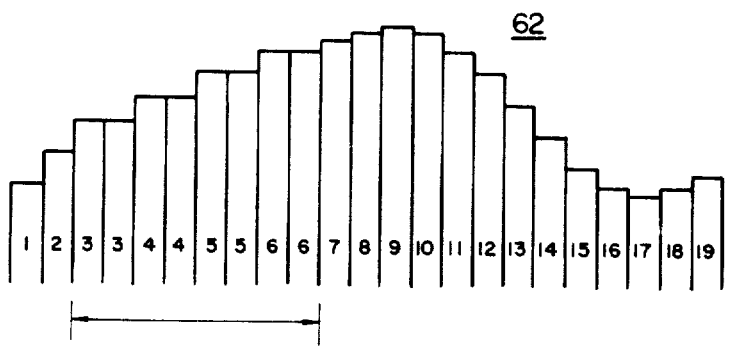
Figure 4:
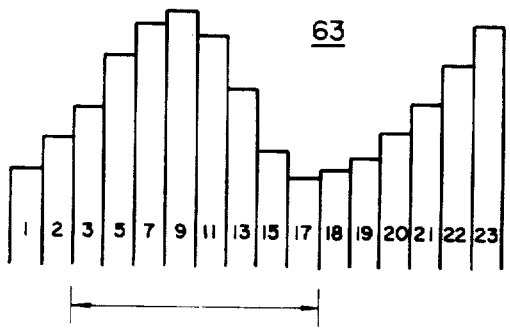

A waveform 61, shown in FIG. 4, is a digital representation of the data words read out of RAM 32 at normal reading rate. When reading address counter 36 is clocked at the lower rate just described, the waveform 61 is somewhat distorted as shown by waveform 62 in which the same data words are repeatedly read out in a range from the third to sixth addresses. However, the difference in digital value between adjacent data words is not substantial so that the waveform 62 can be considered to be continuous.

In a similar manner, in response to the differential count value reaching $2^N-2$, for example, decoder 40 issues a signal that triggers the set input of an overflow flip-flop, or flag 41 to cause the selector 39 to couple count-up pulses 52c from a high frequency oscillator 45 which also takes its input from clock source 60. The frequency of the count-up pulses 52c is higher than the standard frequency so that read address counter 36 is incremented at a higher speed than RAM 32 is read out in response to latch pulses 49 (see FIG. 3). Thus, the differential count value decreases and alternate data words are skipped in a range from the fourth to sixteenth addesses as shown by waveform 63 in FIG. 4 until the differential address count decreases to the predetermined intermediate value. Although this skipping operation can generate discontinuities, such discontinuities could be satisfactorily smoothed for practical purposes by low-pass filters 23, 23b.

What is claimed is:

1. An apparatus for controlling write-in and readout operations of a memory responsive to digital data input signals subject to jitter, the apparatus controlling the memory so that digital output signals read out of the memory and including the data do not include the jitter, comprising:

write-in address means connected to be responsive to said digital data input signals for generating a write address count that changes at a rate substantially equal to the occurrence rate of said digital input signals and for writing each digital input signal into said memory at an address indicated by said write address count;

read-out rate control means for deriving an output signal read-out address means connected to be responsive to the output signal of the read-out rate control means, the read-out address means being operable at a controlled rate in response to said output signal for generating a read address count that changes at a rate whereby the read address count is time interleaved with the times at which said write address count is generated and for reading each digital signal from said memory in response to said read address count;

address monitor means responsive to said changing write and read address counts for detecting the number of digital signals stored in said memory, the address monitor means having first, second and third values respectively corresponding to the memory being at: an upper allowable limit for the number of digital signals stored in said memory, a lower allowable limit for the number of digital signals stored in said memory, and for the number of digital signals of said memory being between the upper and lower allowable limits; and rate control means including: a first source for generating a standard frequency signal, a second source for generating a signal having a higher frequency than the standard frequency and a third source for generating a signal having a lower frequency than the standard frequency, and means responsive to the first, second and third sources and said address monitor means for coupling: (a) said first source to said read-out address means when said detected number is between said first and second values to cause the read-out address means to operate at a standard rate, (b) said second source to said read-out address means in response to said first value being reached to increase the operating rate of said read-out address means, and (c) said third source to said read-out address means in response to said second value being reached to decrease the operating rate of said read-out address means.

2. The apparatus of claim 1, wherein the frequencies of the first, second and third sources are related so that in response to the first value being reached the operating rate increases by N:1 and in response to the second value being reached the operating rate decreases by M:N, where N is an integer greater than one and M is a positive integer less than N.

3. A jitter elimination and time expansion apparatus adapted to receive time-compressed digital signals and sychronization signals subject to jitter, comprising:

a memory;

write-in address means connected to be responsive to said synchronization signals for generating a write address count that changes in response to changes of said synchronization signals and for writing each digital signal into said memory in response to said write address count;

read-out rate control means for deriving an output signal;

read-out address means connected to be responsive to the output signal of the read-out rate control means for generating a variable rate changing read address count at times interleaved with times at which said write address count is generated and for reading each digital signal from said memory in response to said read address count;

address monitor means responsive to said changing write and read address counts for detecting the number of digital signals stored in said memory; the address monitor means including means for detecting when: (a) the detected number reaches a first value corresponding to an upper allowable limit of said memory, (b) the detected number reaches a second value corresponding to a lower allowable limit of said memory, (c) the detected number is between the upper and lower allowable limits;

said read-out rate control means including: a first source for generating a standard frequency signal, a second source for generating a signal having a higher frequency than the standard frequency, and a third source for generating a signal having a lower frequency than the standard frequency, and means responsive to the first, second and third sources and said address monitor means for coupling: (a) said first source as the output signal of said read-out rate control means to said read-out address means when said detected number is between said first and second values to cause the read-out address means to operate at a standard rate, (b) said second source as the output signal of said read-out rate control means to said read-address means in response to said first value being reached to increase the operating rate of said read-out address means, (c) said third source as the output signal read-out rate control means to said read-out address means in response to said second value being reached to decrease the operating rate of said read-out address means so that each digital signal is read out of the memory at a lower rate than each digital signal is written into the memory;

latch means for storing the digital signals read out of said memory; and means for reading the digital signals from said latch means at a constant rate.

4. The apparatus of claim 3 wherein the frequencies of the first, second and third sources are related so that in response to the first value being reached the operating rate increases by N:1 and in response to the second value being reached the operating rate decreases by M:N, where N is an integer greater than one and M is a positive integer less than N.

5. In combination with a variable frequency data source,
a random access memory having: upper and lower address limits, an address input, write enable input, read enable input, data input bus, and data output bus,
address counter means for the address input,
means responsive to the data source for supplying the address counter means with a synchronization signal having a frequency determined by the frequency of the data source and for supplying a signal indicative of the count in the address counter means to the address input and for simultaneously enabling the write enable input of the memory,
means responsive to said address counter means for deriving a signal having first, second and third values respectively indicative of the address input of the memory being at the upper limit for the memory address, the lower limit for the memory address and between the upper and lower limits,
first, second and third oscillators respectively deriving first, second and third fixed frequencies such that the third frequency is greater than the second frequency and the second frequency is greater than the first frequency, and
means responsive to the signal deriving means and the first, second and third oscillators for respectively coupling the first, second and third fixed frequencies to the address counter means while the signal has the third, second and first values and for supplying a signal indicative of the count in the address counter means to the address input and for simultaneously enabling the read enable input of the memory at a time while the write enable input is not enabled.

6. The combination of claim 5 wherein the address counter means includes a read address counter selectively responsive to the first, second and third frequencies and a write address counter responsive to the synchronization signal, the means for deriving a signal having the first, second and third values including means for subtracting the values in the read and write address counters from each other.

* * * * *